United States Patent [19]

Hickey et al.

[11] Patent Number: 5,961,815
[45] Date of Patent: Oct. 5, 1999

[54] HYDROCONVERSION PROCESS

[75] Inventors: Thomas P. Hickey; Dennis Hearn; Hugh M. Putman, all of Pasadena, Tex.

[73] Assignee: Catalytic Distillation Technologies, Pasadena, Tex.

[21] Appl. No.: 08/717,935

[22] Filed: Sep. 23, 1996

Related U.S. Application Data

[60] Provisional application No. 60/006,905, Nov. 17, 1995, and provisional application No. 60/003,258, Aug. 28, 1995.

[51] Int. Cl.$^6$ .......................... C10G 47/02; C10G 11/02; C10G 29/04; B01D 3/00
[52] U.S. Cl. .......................... 208/108; 208/89; 208/110; 208/111; 208/123; 208/124; 208/143; 208/295; 208/347; 208/61
[58] Field of Search ...................... 208/89, 110, 108, 208/111, 123, 124, 143, 295, 347, 61

[56] References Cited

U.S. PATENT DOCUMENTS

| | | | |
|---|---|---|---|
| 3,671,420 | 6/1972 | Wilson et al. | 208/61 |
| 3,671,603 | 6/1972 | Hagemeyer, Jr. et al. | 260/677 |
| 3,699,036 | 10/1972 | Hass et al. | 208/111 |
| 3,884,984 | 5/1975 | Hirose et al. | 260/634 |
| 4,055,483 | 10/1977 | Mertzweiller et al. | 208/213 |
| 4,123,502 | 10/1978 | Hölter et al. | 423/230 |
| 4,194,964 | 3/1980 | Chen et al. | 208/108 |
| 4,198,286 | 4/1980 | Hilfman et al. | 208/111 |
| 4,208,397 | 6/1980 | Coates | 423/651 |
| 4,211,635 | 7/1980 | Chen | 208/93 |
| 4,213,847 | 7/1980 | Chen et al. | 208/111 |
| 4,229,282 | 10/1980 | Peters et al. | 208/111 |
| 4,232,177 | 11/1980 | Smith, Jr. | 585/324 |
| 4,370,221 | 1/1983 | Patmore et al. | 208/112 |
| 4,657,663 | 4/1987 | Gardner et al. | 208/210 |
| 4,731,229 | 3/1988 | Sperandio | 422/188 |
| 4,941,968 | 7/1990 | Reid | 208/236 |
| 5,009,770 | 4/1991 | Miller et al. | 208/209 |
| 5,073,236 | 12/1991 | Gelbein et al. | 203/29 |
| 5,084,259 | 1/1992 | Satek et al. | 423/277 |
| 5,124,027 | 6/1992 | Beaton et al. | 208/309 |
| 5,154,817 | 10/1992 | Reid | 208/48 |
| 5,173,173 | 12/1992 | Vauk | 208/91 |
| 5,266,546 | 11/1993 | Hearn | 502/300 |
| 5,431,888 | 7/1995 | Hickey et al. | 422/191 |
| 5,431,890 | 7/1995 | Crossland et al. | 422/211 |
| 5,597,476 | 1/1997 | Hearn et al. | 208/208 R |
| 5,624,547 | 4/1997 | Sudhakar et al. | 208/89 |

*Primary Examiner*—Mark L. Bell
*Assistant Examiner*—Patricia L. Hailey
*Attorney, Agent, or Firm*—Kenneth H. Johnson

[57] ABSTRACT

The hydroconversion of heavy petroliferous stocks boiling mainly above 400° F. is carried out in a distillation column reactor where concurrently a petroleum stream is fed into a feed zone; hydrogen is fed at a point below said feed zone; the petroleum stream is distilled and contacted in the presence of a cracking catalyst prepared in the form of a catalytic distillation structure at total pressure of less than about 300 psig and a hydrogen partial pressure in the range of 1.0 to less than 70 psia and a temperature in the range of 400 to 1000° F. whereby a portion of the petroleum stream is cracked to lighter products boiling below the boiling point of the feed and products are distilled to remove a vaporous overhead stream comprising products mainly boiling below the boiling point of the feed and a liquid bottoms stream.

15 Claims, No Drawings

HYDROCONVERSION PROCESS

This application claims the benefit of the filing dates of Provisional Application 60/006,905, filed Nov. 17, 1995, and of 60/003,258, filed Aug. 28, 1995, under the provisions of 35 U.S.C. §119(e).

BACKGROUND OF THE INVENTION

1. Field of the Invention

The present invention relates to the conversion of heavy hydrocarbon stocks, particularly those containing sulfur, nitrogen and metal contaminants to provide good yields of motor gasolines, jet fuel (kerosene), diesel fuel and distillate fuels. More particularly the invention relates to a hydrocracking conversion process wherein a heavy feed stock is simultaneously cracked to a lighter boiling product and hydrogenated to prevent formation of undesirable unsaturated compounds. More particularly the invention relates to a process wherein the hydrocracking and separation of the lighter products from the heavier uncracked material occurs simultaneously in a distillation column reactor.

2. Related Information

The operating conditions for the hydroconversion disclosed in U.S. Pat. No. 5,100,855 for heavy hydrocarbon streams, such as petroleum hydrocarbon residue and the like, comprise a hydrogen partial pressure of about 1000 psia to about 3000 psia and above, an average catalyst bed temperature of about 700° F. to about 850° F. and an LHSV of 0.1 to 5 $hr^{-1}$; for hydrocarbon distillates a hydrogen partial pressure of about 200 psia to about 3000 psia, an average catalyst bed temperature of about 600° F. to about 800° F. and an LHSV of 0.4 to 6 $hr^{-1}$.

The purpose of hydrocracking is to produce a more valuable distillate product which boils in the range of about 115–650° F. which can be separated into a gasoline fraction (115–400° F.), a kerosene or jet fuel fraction (350–450), a diesel fraction (400–550) or a light heating oil (500–650). The boiling ranges of the different products overlap as noted.

The advantages of hydrocracking over thermal or fluidized bed catalytic cracking is that a more stable product is made. Kerosene (jet fuel) and diesel are particularly benefited by the reduction in unsaturated compounds. Gasoline boiling range material from a hydrocracker, while low in octane, is particularly suitable as feed to the reforming units because of low sulfur, nitrogen and olefin contaminants.

A conventional hydrocracker is a series of beds in a vertical reactor with the charge being passed downflow in concurrent flow with hydrogen. The reactions taking place are exothermic, resulting in a temperature rise in each bed. Temperature is controlled by the addition of cold hydrogen quench between each bed.

In U.S. Pat. No. 4,194,964, Chen, et al propose a process operated at about 300 psig to 3000 psig and high hydrogen partial pressures for concurrent hydroprocessing and distillation of heavy petroleum stocks. Essentially, Chen et al disclose the use of concurrent distillation and hydroprocessing of the heavy stocks for the standard high pressure treating and hydrocracking. The range of conditions is fairly consistent with the prior art processes. Chen et al specifically disclose hydrocracking at elevated pressures of 750 and 1000 psig with the unexpected result that separation by distillation can be achieved at the higher pressures.

Chen et al call for a column conducting reactions and distillations, but failed to disclose how to achieve such a column while operating an experimental packed column for the reactions, which appear as a single stage flash rather than a true distillation.

A method of carrying out catalytic reactions has been developed wherein the components of the reaction system are concurrently separable by distillation using the catalyst structures as the distillation structures. Such systems are described variously in U.S. Pat. Nos. 4,215,011; 4,232,177; 4,242,530; 4,250,052; 4,302,356 and 4,307,254 commonly assigned herewith. In addition, commonly assigned U.S. Pat. Nos. 4,443,559, 5,057,468, 5,262,012 5,266,546 and 5,348, 710 disclose a variety of catalyst structures for this use and are incorporated by reference herein.

While Chen et al have obtained hydrocracking at lower than previous pressures (about 2000 psig has previously been considered necessary for hydrocracking), the present invention provides a process that operates at only a fraction of the pressures used by the general prior art and below the lowest pressure projected by Chen et al.

SUMMARY OF THE INVENTION

The present invention is a process for the hydroconversion of heavy petroliferous stocks comprising feeding (1) a petroleum stream boiling mainly above 400° F., for example above 650° F. and (2) hydrogen to a distillation column reactor;

concurrently in said distillation column reactor (a) feeding said petroleum stream into a feed zone and preferably feeding a portion of said hydrogen at a point below said feed zone, (b) distilling said petroleum stream whereby there are vaporous petroleum products rising upward through said distillation column reactor, an internal reflux of liquid flowing downward in said distillation column reactor and condensing petroleum products within said distillation column reactor, (c) contacting said petroleum stream and said hydrogen in the presence of a hydroconversion catalyst prepared in the form of a catalytic distillation structure at total pressure of less than about 300 psig, preferably less than 290 psig, more preferably less than 250 psig, for example in the range of 0 to 200 psig, hydrogen partial pressure in the range of 1.0 to less than 70 psia and a temperature in the range of 400 to 1000° F., preferably up to 700° F., whereby a portion of the petroleum stream is cracked to lighter products boiling below the boiling point of said petroleum stream and (d) distilling products in said column to remove a vaporous overhead stream comprising products mainly boiling below said petroleum stream, and a liquid bottoms stream, condensing a portion of the overheads and returning a portion of said condensed overheads to said distillation column reactor as external reflux.

In addition to cracking the heavier petroleum materials, the process may also be operated to remove sulfur and nitrogen compounds contained within said petroleum stream by reacting them with hydrogen.

The term "hydroconversion" is used herein to mean a catalytic process conducted in the presence of hydrogen in which at least a portion of the heavy constituents and coke precursors (as measured by Conradson carbon residue) of the hydrocarbonaceous oil is converted to lower boiling hydrocarbon products while simultaneously reducing the concentration of nitrogenous compounds, sulfur compounds and metallic contaminants. The term hydroconversion is understood to include such, hydrotreating processes as hydrocracking, hydrodesulfization, hydrodenitrogenation, hydroisomerization and the like. Hydrocracking is the term applied to a process for the reduction in average molecular weight (and gravity) of a petroleum fraction wherein hydrogen is added to the lower molecular weight material to saturate what, in the absence of hydrogen, would be a double or triple bond left when the molecule is broken. Generally hydrocracking is practiced on a heavy gas oil fraction which has a boiling range above 650° F. Sometimes the fraction is limited to the fraction boiling between about 650–1000° F., which is a cleaner feed stock.

DETAILED DESCRIPTION OF THE INVENTION

Under the conditions of the catalytic hydroconversion, other reactions, such as desulfurization, denitrogenation and demetallization are carried out. The present invention is primarily directed to hydrocracking, during which the other hydroconversion processes will usually occur to some extent. The treatment of heavy hydrocarbon streams, such as resids, presents a myriad of refinery difficulties. For example catalysts having high activity for denitrogenation and desulfurization also tend to deactivate rapidly, because these catalysts have relatively small average pore diameter (less than 200 Å), which quickly become blocked by the relatively large particles, such as asphaltenes in heavy petroleum streams. The large average pore size catalysts on the other hand, although excellent for demetallization, removing asphaltenes and Shell hot filtration solids, have lower surface area, which engenders a loss in catalyst activity.

By the selection of appropriate catalysts (supports, surface area, pore size, active components and the like), usually arranged in different layers, multiple functions may be carried out in a single column. The use of catalysts with bimodal pore size distribution or graded systems which provide gradual change in functions or capacities in a particular function can eliminate other down stream treatments.

The grading or arrangement of the catalyst need not be in a single direction in the tower, since the feed to the tower may be intermediate to the catalytic beds and there are both overhead and bottom streams, which may be treated as required. The hydrogen may be introduced at any point in the column or at multiple points in the column, although in the preferred embodiment hydrogen is introduced below the feed (or with the feed) or below the lowest catalyst bed in the column.

The principal products of the hydroconversion will be lower boiling materials some of which are recovered overhead or as drawstreams along the column. In some operations the bottoms will contain substantially unconverted feed stock, while in other operations the bottoms will comprise totally or partially converted products. By selection of the catalysts, the products can also be low sulfur and low nitrogen materials. The catalysts contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Relatively small amounts of cobalt present in a hydroconversion catalyst provides excellent activity. Catalysts containing a Group VIB metal such as molybdenum and a Group VIII such as cobalt or nickel are preferred. Catalysts suitable for the hydroconversion reaction include cobalt-molybdenum, nickel-molybdenum and nickel-tungsten. The metals are generally present as oxides supported on a neutral base such as alumina, silica-alumina or the like. The metals may be sulfided either in use or prior to use by exposure to sulfur compound containing streams.

Molecular sieve catalysts used in prior art hydrocracking may also be used in the present process.

The hydroconversion catalysts used in the catalytic distillation structure of the present process can be prepared by the typical commercial method of impregnating an inorganic oxide support or any other method known to those skilled in the art. The pore volume distribution as desired can be similarly obtained. Smaller pore size (below 200 Å) may be more likely to plug and bimodal distribution throughout the range of 10–10,000 Å is useful.

The porous refractory oxide, e.g. alumina, can be impregnated with a solution, usually aqueous, containing a heat decomposable compound of the metal to be deposited. The metals may be deposited from one solution or several in any order and dried and calcined. Alternatively the inorganic support may be prepared from gels with the metal deposited as described or incorporated into the gels during the gelling step.

The particulate hydroconversion catalyst may be present in the catalytic distillation structures as powder, irregular particles, pellets, spheres, polylobes, or extrudates of other shapes and the like. The particular form of the catalytic material in the structure is not critical, so long as sufficient surface area is provided to allow a reasonable reaction rate. The sizing of catalyst particles can be best determined for each catalytic material (since the porosity or available internal surface area will vary for different material and of course affect the activity of the catalytic material).

In a preferred embodiment the catalyst is contained in a woven wire mesh structure as disclosed in U.S. Pat. No. 5,266,546, previously noted. Other catalytic distillation structures useful for this purpose are disclosed in U.S. Pat. Nos. 4,731,229 and 5,073,236 which are also incorporated by reference.

For the present hydroconversions the preferred catalyst structures for the packing are those employing the more open structure of permeable plates or screen wire.

The preferred hydrogen partial pressure is less than 70 psia. This preferably is a hydrogen partial pressure in the range of about 1.0 to 20 psia and even more preferably no more than 15 psia. Optimal results have been obtained in the range between 1.0 and 20 psia hydrogen partial pressure. The low total pressures are also unexpected. The present system operates well below what the prior art indicates as the lower pressures.

LHSV's in the range of 1 to 10 may be used with internal reflux over the range of 0.2 to 20 L/D (wt. liquid just below the catalyst bed/wt. distillate) give excellent conversions (conversion is understood to mean the percent decrease in the products boiling above 400° F. after hydroconversion). Total reflux may be employed with the products all recovered as side draws or bottoms.

It is believed that in the present reaction catalytic distillation is a benefit first, because the reaction is occurring concurrently with distillation, the initial reaction products and other stream components are removed from the reaction zone as quickly as possible reducing the likelihood of side reactions. Second, because all the components are boiling the temperature of reaction is controlled by the boiling point of the mixture at the system pressure. The heat of reaction simply creates more boil up, but no increase in temperature at a given pressure. As a result, a great deal of control over the rate of reaction and distribution of products can be achieved by regulating the system pressure. Also, adjusting the throughput (residence time=liquid hourly space velocity$^{-1}$) gives further control of product distribution and to a degree control of the side reactions such as oligomerization. A further benefit that this reaction may gain from catalytic distillation is the washing effect that the internal reflux provides to the catalyst thereby reducing polymer build up and coking.

The arrangement of the feeds into the reaction distillation column also creates flexibility in the manner and application of the present invention to various of the heavy petroleum streams. For example, in one embodiment a heavy resid high in asphaltenes may be fed to feed zone between beds of catalytic material prepared as distillation structures. The catalytic material in a first zone above the feed zone would be cobalt-molybdenum deposited on bimodal alumina support with pore distribution of 20% between 10 and 100 Å, 60% between 100 and 1000 Å (hydrodemetallization) and a second upward bed of cobalt-molybdenum deposited on bimodal alumina support with pore distribution of 40% between 10 and 100 Å, 40% between 100 and 1000 Å (cracking) and a third upper bed of nickel deposited on high surface area alumina (denitrogenation and desulfurization) and below the feed zone a large pore alumina (over 200 Å average) for asphaltene and solids removal. Hydrogen may be supplied along the column, but should be supplied at the lower end of the column and in the reboiler. The total pressure in the column would be 10 to 100 psig with a hydrogen partial pressure in the range of 1 to 70 psia at an LHSV of 1 to 10 hr$^{-1}$ and hydrogen flow at 100 to 5000 SCFB. Under these conditions the temperature (determined by the pressure) would be in the range of 400 to 1200° F.

In an another embodiment there can be conventional distillation trays above, below or dispersed amongst the beds within the column. In some embodiments there may be only catalyst beds above or below the feed zone.

It is apparent that many other arrangements and catalyst types can be used in the column along its profile. In a distillation column the temperature profile determines what constituent is present at a given point in the column based on the boiling point of the constituent. Thus by the judicious operation of the column the cracking products from one bed can be directed to another bed with a specialized catalyst to treat the constituent in the most effective manner.

The hydrogen rate to the reactor must be sufficient to maintain the reaction, but kept below that which would cause flooding of the column which is understood to be the "effectuating amount of hydrogen" as that term is used herein. Hydrogen flow rates are typically calculated as standard cubic feet per barrel of feed (SCFB) and are in the range of 100 to 5000 SCFB.

Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the petroleum constituents in the presence of the catalyst to result in their conversion.

The invention claimed is:

1. A process for the hydrocracking of heavy petroliferous stocks comprising (A) feeding (1) a petroleum stream boiling mainly above 400° F. and (2) hydrogen to a distillation column reactor;
   (B) concurrently in said distillation column reactor
      (1) distilling said petroleum stream whereby there are vaporous petroleum products rising upward through said distillation column reactor, an internal reflux of liquid flowing downward in said distillation column reactor and condensing petroleum products within said distillation column reactor,
      (2) contacting said petroleum stream and said hydrogen in the presence of a hydrocracking catalyst at total pressure of less than about 300 psig, hydrogen partial pressure in the range of 1.0 to less than 70 psia and a temperature in the range of 400 to 1000° F. whereby a portion of the petroleum stream is cracked to lighter products boiling below the boiling point of said petroleum stream and
      (3) distilling products in said column to remove a vaporous overhead stream comprising products mainly boiling below the boiling point of said petroleum stream and a liquid bottoms stream, the specific gravity and average molecular weight of the combined overhead stream and liquid bottoms stream being lower than that of petroleum stream, and
   (C) condensing a portion of the overheads and returning a portion of said condensed overheads to said distillation column reactor as external reflux.

2. The process according to claim 1 wherein said total pressure is less than 290 psig.

3. The process according to claim 2 wherein said total pressure is less than 250 psig.

4. The process according to claim 3 wherein said total pressure is in the range of 0 to 200 psig.

5. The process according to claim 1 wherein said hydrogen partial pressure is less than 50 psia.

6. The process according to claim 5 wherein said hydrogen partial pressure is in the range of 1.0 to 20 psia.

7. The process according to claim 6 wherein said hydrogen partial pressure is no more than 15 psia.

8. The process according to claim 4 wherein said hydrogen partial pressure is in the range of 1.0 to 15 psia.

9. The process according to claim 1 wherein the catalyst contains components from Group V, VIB, VIII metals of the Periodic Table or mixtures thereof.

10. The process according to claim 9 wherein the catalyst comprises cobalt-molybdenum.

11. The process according to claim 9 wherein the catalyst comprises nickel-molybdenum.

12. The process according to claim 9 wherein the catalyst comprises nickel-tungsten.

13. The process according to claim 9 wherein the temperature of said contacting is in the range of 400–700° F.

14. The process according to claim 1 wherein the boiling point of the petroleum stream is below 650° F.

15. The process according to claim 1 wherein the catalyst is prepared in the form of a catalytic distillation structure.

* * * * *